(12) United States Patent
Paar et al.

(10) Patent No.: US 6,670,041 B2
(45) Date of Patent: Dec. 30, 2003

(54) SELF-CROSSLINKING WATER-DILUTABLE BINDERS

(75) Inventors: Willibald Paar, Graz (AT); Roland Feola, Graz (AT); Johann Gmoser, Graz (AT); Michael Gobec, Graz (AT)

(73) Assignee: Solutia Austria GmbH, Werndorf (AT)

( * ) Notice: Subject to any disclaimer, the term of this patent is extended or adjusted under 35 U.S.C. 154(b) by 82 days.

(21) Appl. No.: 10/001,114

(22) Filed: Nov. 2, 2001

(65) Prior Publication Data

US 2002/0086918 A1 Jul. 4, 2002

(30) Foreign Application Priority Data

Nov. 15, 2000 (AT) .......................................... 1927/2000

(51) Int. Cl.$^7$ ............................................... B32B 15/08
(52) U.S. Cl. .................... 428/418; 427/372.2; 523/416; 523/417; 523/424; 525/405; 525/500; 525/510; 525/526; 528/118; 528/123; 528/162; 528/250; 528/254; 528/259; 528/421
(58) Field of Search ................................. 525/405, 500, 525/510, 526; 427/372.2; 528/118, 123, 162, 250, 421, 254, 259; 428/418; 523/416, 417, 424

(56) References Cited

FOREIGN PATENT DOCUMENTS

| DD | 27 11 385 A1 | 9/1978 |
|---|---|---|
| DE | 20 33 770 A1 | 2/1971 |
| DE | 23 20 301 A1 | 4/1975 |
| DE | 23 57 045 A1 | 5/1975 |
| DE | 24 19 179 A1 | 11/1975 |
| DE | 25 41 801 A1 | 3/1977 |
| DE | 25 54 080 A1 | 6/1977 |
| DE | 30 45 251 A1 | 6/1982 |
| EP | 0 158 128 A1 | 10/1985 |
| EP | 0 179 184 A1 | 4/1986 |
| GB | 2 008 152 A | 5/1979 |
| GB | 2 050 381 A | 1/1981 |
| GB | 1 604 545 | 12/1981 |
| JP | 06-057 694 A1 | 1/1994 |
| WO | WO 83/00872 A1 | 3/1983 |

*Primary Examiner*—Robert Dawson
*Assistant Examiner*—D. Aylward
(74) *Attorney, Agent, or Firm*—ProPat, L.L.C.

(57) ABSTRACT

Water-dilutable binders which are self-crosslinking at room temperature, comprising reaction products ABF with epoxy-amine adducts A and formaldehyde resin formers B selected from phenols B1, (substituted) ureas B2, melamine B3, guanamines B4, and mixtures of said resin formers, with formaldehyde F or compounds which give off formaldehyde under the reaction conditions, may be formulated, following at least partial neutralization, to give aqueous coating materials which give coatings affording outstanding corrosion protection.

9 Claims, No Drawings

SELF-CROSSLINKING WATER-DILUTABLE BINDERS

FIELD OF THE INVENTION

The invention relates to water-dilutable binders which are self-crosslinking at room temperature.

BACKGROUND OF THE INVENTION

Film-forming binders based on reaction products of Mannich bases and epoxy resins are described in a series of publications. According to DE-A 20 33 770, 23 20 301, 23 57 045, 24 19 179, 25 41 801, 25 54 080, 27 11 385 and 30 45 251, Mannich bases obtained from polyhydric phenols, secondary amines and formaldehyde are reacted with epoxy resins, it being possible for both the phenols and the epoxy resins to be subjected to modifications of various kinds with, for example, monoblocked diisocyanates, other phenols or metal salts.

As is evident from the cited references, binders of this kind require baking temperatures of around 190° C. for crosslinking, and even then the films by no means meet the automobile industry's practical requirements in terms, for example, of salt spray resistance. Moreover, the crosslinking of these products is accompanied by elimination of formaldehyde and amines, which may lead to a pollution of the environment. The purpose of a large number of the above-mentioned modifications is therefore less to improve the film properties, but rather to reduce the amount of elimination products. In the case of modification with monoblocked diisocyanates, for instance, it is explicitly stated in DE-A 25 54 080 that the isocyanate groups contribute little to the crosslinking and serve only to trap liberated amines.

WO 83/00872 discloses cathodically depositable electrodeposition coating binders which are obtained by cocondensation of partially defunctionalized epoxy resins and phenolic resols and simultaneous or subsequent reaction of the epoxide groups with primary or secondary amines. A substantial disadvantage in the preparation of these products lies in the need to prepare the phenolic resols, which is known to involve a considerable amount of time and to result in relatively large amounts of phenol- and salt-containing wastewaters. Moreover, any salt residues in the resin may lead to defects in the course of electrodeposition.

GB-A 2,050,381 discloses cathodically depositable coating compositions which are obtained by mixing epoxy resin-amine adducts and etherified phenol-formaldehyde resins and/or amino resins and heating the mixtures to at least 50° C. A partial condensation of the components is intended to improve the emulsion stability of the protonated products in water, in comparison to simple mixtures of the stated components. In the epoxy resin-amine adducts that are used in accordance with this reference, the amino groups present are substantially tertiary amino groups, since the reaction takes place under conditions which lead to a substantially complete reaction of the amino hydrogens. Because of their structure, products of this kind require baking temperatures of more than 170° C. for adequate crosslinking.

SUMMARY OF THE INVENTION

It has now been found that reaction products of epoxy-amine adducts with formaldehyde and compounds which are able to form condensation resins with formaldehyde may be formulated to give binders which are self-crosslinking at room temperature. The reaction is preferably conducted not between a preformed formaldehyde condensation resin and epoxy-amine adducts but instead with epoxy-amine adducts, formaldehyde resin formers and formaldehyde or a formaldehyde source each separately present in the reaction mixture at the start of the reaction.

The invention accordingly provides water-dilutable binders which are self-crosslinking at room temperature, comprising reaction products ABF of epoxy-amine adducts A and formaldehyde resin formers B selected from phenols B1, (substituted) ureas B2, melamine B3, guanamines B4, and mixtures of said resin formers, with formaldehyde F or compounds which release formaldehyde under the reaction conditions, such as paraformaldehyde or trioxane.

The term "water-dilutable" refers to those binders which—after partial neutralization if appropriate—form stable mixtures with water which do not undergo macroscopic phase separation or sedimentation when stored at room temperature (20° C.) over at least 4 weeks.

DETAILED DESCRIPTION OF THE PREFERRED EMBODIMENT

The epoxy-amine adducts A are obtained by reacting epoxy resins A1 containing at least 2 epoxide groups per molecule and having a specific epoxide group content SEC of from 1.0 to 5.6 mol/kg with aliphatic amines A2 having from one to twenty, preferably from 4 to 18 carbon atoms and containing at least one primary amino group and, if desired, another primary or tertiary amino group, and, if desired, a compound A3 containing at least one carboxyl group or at least one secondary amino group. The reaction is conducted in such a way that, when it is at an end, epoxide groups can no longer be detected in the reaction mixture.

The epoxy resins A1 which can be used for the invention are commercially available customary diepoxide or polyepoxide compounds, such as are obtained by reaction of polyhydric phenols, especially bisphenol A, or phenol novolaks and epichlorohydrin. If desired it is also possible to use other epoxy resins, based for example on polyols. Products of this kind are known to the skilled worker and are described in large numbers in the literature. For the process of the invention it is preferred to use epoxy resins based on bisphenol A or phenol novolaks having a specific epoxide group content SEC of from 1.0 to 5.6 mol/kg ("epoxide equivalent weight" of from 180 to 1000 g/mol).

Preferred amines A2 are primary monoalkylamines, especially those whose alkyl radical contains 4 or more carbon atoms, or primary alkylenediamines or diamines which in addition to the primary amino group contain a tertiary amino group as well, e.g., a dialkylamino group. As preferred representatives, mention may be made of n-butylamine, isobutylamine, hexylamines, especially n-hexylamine, 2-ethylhexylamine, ethylenediamine and its homologues such as 1,2 and 1,3-diaminopropane, 1,4-diaminobutane, and 1,6-diaminohexane, and also primary-tertiary diamines, such as dimethylaminopropylamine, diethylaminopropylamine and homologues of this series. Particular preference is given to using mixtures of alkylamines and/or alkylenediamines and dialkylamino-alkylamines.

The modifiers A3 are selected from carboxyl compounds and compounds containing at least one secondary amino group.

Preference is given to using, for example, carboxyl-containing adducts of maleic anhydride with unsaturated oils and/or unsaturated hydrocarbon compounds whose anhydride groups have been opened by monoesterification with monohydroxy compounds, where the free carboxyl groups, if desired, in part are reacted with monoepoxide compounds. By means of such modification it is possible to substantially improve the film surface and the flexibility of the films.

The carboxyl compounds of this kind suitable for modifying the epoxy resin-amine adduct are obtained in conventional manner by subjecting maleic anhydride to addition reaction with unsaturated oils, examples being tung oil, linseed oil, dehydrated castor oil, soybean oil, sunflower oil, and similar natural oils. As starting material it is also possible to employ synthetically prepared hydroxyl-free esters of the fatty acids present in the abovementioned oils, and/or of tall oil fatty acids, with polyols. As polyene compounds it is preferred to employ unsaturated, low molar mass hydrocarbon polymers or oligomers for reaction with maleic anhydride. Examples of this class of compound are the so-called polybutadiene oils, viz. liquid oligomers of butadiene with a variety of stereospecific structures or the corresponding oligomers of pentadienes or cyclopentadiene, the use of mixed oligomers also being possible. These compounds normally have molar masses (weight averages MW) of between 400 and 3 000 g/mol. It is of course also possible to employ mixtures of these oligomers in order to form adducts with the maleic anhydride.

The amount of maleic anhydride is chosen such that the carboxyl compound prepared therefrom has an acid number of from 30 to 130 mg/g, preferably from 35 to 80 mg/g.

For monoesterification, the maleic anhydride adducts are reacted with monohydroxy compounds in a known manner at from 50 to 150° C. Monohydroxy compounds employed in this context include saturated or unsaturated monoalcohols having from 1 to 18 carbon atoms, such as methanol and its homologues, fatty alcohols, allyl alcohol and the like. As monohydroxy compounds it is also possible to use glycol monoesters of (meth)acrylic acid, such as hydroxyethyl (meth)acrylate, hydroxypropyl (meth)acrylate, and also the further homologous and isomeric compounds. In the case of the unsaturated monohydroxy compounds, it is advantageous to conduct the reaction in the presence of inhibitors, such as hydroquinone.

One possibility for reducing the number of carboxyl groups in these monoesters is to react them with monoepoxide compounds, such as esters of epoxidized fatty acids or glycidyl esters or glycidyl ethers. Examples of compounds highly suitable for this purpose are the glycidyl esters of KOCH acids, especially those whose tertiary carbon atom carries at least two alkyl residue having at least one carbon atom.

In order to prepare the epoxy-amine adducts A that are suitable for the invention, the compounds A2 are used preferably in an amount such that the ratio of the amount of substance of the amino groups in A2 to the amount of substance of the epoxide groups in A1 is from 0.6:1 to 1:1 and such that, preferably, the ratio of the sum of the amounts of substance of the carboxyl groups and of the secondary amino groups in the compounds A3 to the amount of substance of the epoxide groups in A1 is from 0:1 to 0.4:1.

In accordance with the invention, the epoxy-amine adduct A is reacted with one or more compounds B and formaldehyde F or a formaldehyde donor compound.

The amounts of the formaldehyde resin formers B and of formaldehyde F are preferably chosen so that the ratio of the amount of substance of the aminic hydrogen atoms (NH groups) remaining in A to the amount of substance of the compounds B is from 0.5:1 to 1:1 and such that the ratio of the amount of substance of formaldehyde to the amount of substance of the formaldehyde-reactive groups in B is from 0.25:1 to 0.9:1, with particular preference from 0.6:1 to 0.8:1.

The present invention additionally provides a process for preparing the product ABF, where the reaction of component A1, A2 and, if appropriate, A3 is effected at a temperature of from 50 to 120° C. until epoxide groups can no longer be detected. In the second stage, the epoxy-amine adduct A is reacted together with the formaldehyde resin formers B and formaldehyde at a temperature of from 50 to 90° C. until the formaldehyde has been consumed. The reaction product is neutralized with acids and subsequently transferred to the aqueous phase, it being possible to add water-dilutable organic solvents if desired.

The process of the invention is notable for its ease of implementation. A particular advantage lies in the absence of unusable by-products.

The coating compositions appropriately formulated from the binders prepared in accordance with the invention exhibit excellent properties following application and drying of the paint film at room temperature. The reason for this may well lie in the hydrolysis resistance of the molecule formed by direct linkage of epoxy resin, amine and formaldehyde resin former B. At drying temperatures above 10° C., and even without the use of catalysts, the products give films of optimum corrosion resistance.

In the first reaction stage, preferably in the presence of an aprotic solvent, the epoxy resins A1 are reacted with the primary amine A2 to give an epoxy resin-amine adduct containing secondary amino groups. The ratio of the amount of substance of the available epoxide groups of the epoxy resin A1 to that of the primary amino groups in A2 is preferably from 1:0.6 to 1:1.0 mol/mol. The reaction takes place preferably at from 50 to 90° C.

As solvents, whose presence is in certain cases important for the control of the reaction, use is made of aromatic hydrocarbons, such as toluene or xylene, or glycol diethers, such as diethylene glycol dimethyl ether. It is also possible to use glycol monoethers. The mass of the solvent is preferably between 10 and 50%, of the mass of the epoxy-amine adduct.

If desired, the epoxy-amine adduct may be modified with compounds A3 selected from carboxyl compounds, such as saturated or unsaturated fatty acids, carboxyl-containing polyesters and other, carboxyl-containing prepolymers, such as, for example, on acrylics. The modifiers A3 are preferably used in an amount such that up to 40% of the available epoxide groups originally present in A1 are consumed. Fatty acids used are preferably monocarboxylic acids having from 7 to 20 carbon atoms, of synthetic or natural origin. By way of example, it is possible to use benzoic acid, isooctanoic and isononanoic acid, α-branched synthetic monocarboxylic acids having $C_8$–$C_{12}$ alkyl radicals (known as KOCH acids) or oil fatty acids and tall oil fatty acids. Other monocarboxyl compounds for modifying the epoxy resin-amine adducts are monoesters of dicarboxylic acids with monoalcohols having more than 3 carbon atoms or carboxylic acids modified with oxazolidines. The preparation of the latter is described, for example, in AT Patent 375 946. The oxazolidines here act as additional formaldehyde donors. The reaction of the epoxy resins A1 with the carboxyl group-bearing modifiers A3 takes place appropriately before the reaction with the amines A2 at from 90 to 120° C.

The reaction of this group of the carboxyl compounds A3 with the epoxide groups of the epoxy resin A1 takes place preferably at from 90 to 150° C. The reaction is advantageously continued until there has been complete bonding of the modifying component.

As further modifiers it is also possible to use secondary amines, especially secondary alkyl amines. The solubility of the products can be influenced by means of the resulting tertiary amino groups.

The reaction stage leading to the epoxy resin-amine adduct is conducted until an epoxide group content of virtually 0 is obtained; in other words, the resulting epoxy resin-amine adducts are free from epoxide groups.

The resulting epoxy-amine adduct A, modified if desired with carboxyl and/or amine compounds A3, is reacted according to the invention with formaldehyde or with a compound which gives off formaldehyde under the reaction conditions, and with a formaldehyde resin former B selected from phenolic compounds B1, namely monohydric and polyhydric phenols, alkyl phenols, aminoalkylation products of monosubstituted monohydric or dihydric phenols, and the amino resin formers B2 of the urea, melamine or guanamine type. The amounts of the reactants are preferably chosen such that the ratio of the amount of substance of the NH groups in the epoxy resin-amine adduct A to the amount of substance of the formaldehyde resin formers B is from 1:0.5 to 1:1 mol/mol and such that the ratio of the amounts of substance of the formaldehyde-reactive sites in the formaldehyde resin formers B to the amount of substance of formaldehyde (or of methylol groups which have formed in the reaction product) is from 1:0.25 to 1:0.9 mol/mol. The reaction takes place preferably at from 50 to 90° C. and is conducted until the formaldehyde is substantially completely consummarated.

As phenol component B1, use is made of phenol itself in its commercially customary supply forms, e.g., liquefactum (90%), or alkyl phenols, such as the methyl-, butyl- or higher alkyl phenols, such as nonylphenol, or diphenols of the formula HO—Ar—R—Ar—OH, in which Ar is an arylene radical, particularly 1,4-phenylene, and R is a straight-chain or branched alkylene radical having from 1 to 5 carbon atoms, a preferred diphenol being bisphenol A. In order for the desired properties to be achieved, the phenols used must contain at least 2 formaldehyde-reactive sites.

The monohydric or polyhydric phenol and/or alkylphenol used as phenolic formaldehyde resin former B1 may also be replaced in part, or totally by other formaldehyde-reactive compounds. Thus it has been found that the phenols may be replaced by amino compounds B2 of the urea, thiourea, melamine or guanamine type, thereby achieving a further improvement in the solubility characteristics and color fastness of the film.

In this variant, the phenol compounds B1 employed are replaced in whole or in part by formaldehyde-reactive amino compounds B2 of the urea, thiourea or imidourea type, of the melamine B3 type, or of the guanamine B4 type such as acetoguanamine or benzoguanamine, or by mixtures of these compounds, and in a conjoint reaction stage these compounds are reacted with the formaldehyde and with the amino compound containing secondary amino groups. The mass fraction of aminic formaldehyde resin formers of groups B2 to B4 is preferably at least 20%, based on the sum of the masses of all components of type B.

The whole or partial replacement of the phenolic compounds B1 by the formaldehyde-reactive amino compounds B2 results not only in an improvement in the solubility characteristics but also in increased adhesive strength of the deposited film both to the coated substrate and to possible subsequent coats.

Where urea is used as component B2, it is preferably employed in the form of an aqueous solution having a mass fraction of solids of from 30 to 50%, in particular about 40%.

Substituted ureas is a term used to refer comprehensively to thiourea, N-alkyl(thio)ureas, N,N-dialkyl- and N,N'-dialkyl(thio)ureas having $C_1$ to $C_{20}$ alkyl radicals, (optionally ring-substituted) ethylene- and propyleneurea, and glycoluril. Particular preference is given to unsubstituted urea.

The formaldehyde is used preferably as paraformaldehyde in one of the commercially customary forms with an effective formaldehyde content of from 80 to 100%. As formaldehyde donors or formaldehyde donor compounds it is also possible in addition to use those compounds which split off formaldehyde under the process conditions. Such compounds include paraformaldehyde, the cyclic oligomers trioxane and tetraoxane, and also, for example, oxazolidine compounds, which are employed, for example, in the form of their carboxyl derivatives or as amines to modify the epoxy resin. The formaldehyde is used in an amount such that the ratio of the amounts of substance of formaldehyde to formaldehyde-reactive groups in the reaction mixture is from 25 to 90, preferably from 30 to 85, with particular preference from 60 to 80 mol/(100 mol). In order to obtain a self-crosslinking structure it is advantageous for the amount of substance of formaldehyde to be at least 30% greater than that of the NH groups present.

In order to prepare aqueous coating materials, the basic groups of the reaction product ABF are neutralized partially (i.e., to at least 5%) or completely with acids, preferably with formic acid, acetic acid or lactic acid. For neutralizing it is also possible to employ inorganic polybasic acids such as phoshoric acid (or partial esters thereof) or boric acid. For practicable dilutability, neutralization of from 10 to 40% of the basic groups, or an amount of from about 20 to 60 mmol of acid per 100 g of resin solids is normally sufficient. The binders are then diluted to the desired concentration using deionized water; if desired prior to neutralization or prior to dilution, or in the partly diluted state, they are processed with pigments, fillers and other additives to give pigmented paints.

The aqueous coating materials which comprise the binders of the invention may be employed in particular for coating metallic substrates, in which case they give the coated substrate outstanding corrosion protection. They may be applied by brushing, roll coating, spraying, or other customary application techniques to the substrates. They may likewise be used advantageously to coat temperature-sensitive substrates such as wood, paper, cardboard and textile surfaces, since the binders of the invention dry rapidly even at room temperature.

Of course, they may also be used to coat mineral substrates such as stone, concrete and layers of plaster and mortar.

In the coating of wood, the use of the binders of the invention in primers provides an excellent insulating effect against disruptive components from the wood.

EXAMPLES

The examples below illustrate the invention without restricting it in its scope. In the examples which follow, as in the text which precedes them, all figures with the unit "%" are mass fractions (ratio of the mass of the substance in question to the mass of the mixture), unless specified otherwise. Concentrations in "%" are mass fractions of the dissolved substance in the solution (mass of the dissolved substance divided by the mass of the solution).

The amine number is defined in accordance with DIN 53 176 as the ratio of that mass $m_{KOH}$ of potassium hydroxide which in neutralization consumes the same amount of acid as a sample for analysis to the mass $m_B$ of said sample (mass of the solid in the sample in the case of solutions or dispersions); its customary unit is "mg/g". The acid number is defined in accordance with DIN 53 402 as the ratio of that mass $m_{KOH}$ of potassium hydroxide which is required to neutralize a sample for analysis to the mass $m_B$ of said sample (mass of solid in the sample in the case of solutions or dispersions); its customary unit is "mg/g".

The specific epoxide group content "SEC" is defined as the ratio of the amount of substance of epoxide groups n (EP) to the mass $m_B$ of the substance (and is therefore the reciprocal of the so-called "EV value" or "epoxide equivalent weight" (EEW); the SI unit is "mol/kg":

$$SEC=n(EP)/m_B$$

The following abbreviations are used in the examples:
EPH I diepoxy resin based on bisphenol A, specific epoxide group content 5.26 mol/kg ("epoxide equivalent weight" about 190 g/mol)
EPH II diepoxy resin based on bisphenol A, specific epoxide group content 2.1 mol/kg ("epoxide equivalent weight" about 475 g/mol)
EPH III diepoxy resin based on polypropylene glycol, specific epoxide group content 3.13 mol/kg ("epoxide equivalent weight" about 320 g/mol)
DEAPA diethylaminopropylamine
EHA 2-ethylhexylamine
NBA n-butylamine
HMDA hexamethylenediamine
DEA diethylamine
BPA bisphenol A
PH phenol, liquefactum 91%
NPH nonylphenol
PTB p-tert-butylphenol
B180 liquid polybutadiene oil (about 75% 1,4-cis, about 24% 1,4-trans and about 1% vinyl double bonds; molar mass about 1 500 g/mol (±15%), iodine number about 450 g/(100 g))
MSA maleic anhydride
CE technical mixture of glycidyl esters of 1,1-dimethyl ($C_7$–$C_9$)-alkanecarboxylic acids
PF 91 91% strength paraformaldehyde
HMDA/BUAC reaction product of HMDA (1 mol) and n-butyl acrylate (2 mol)
HMDA/CE reaction product of HMDA (1 mol) and CE (2 mol)
EHX 2-ethylhexanol
EGL ethylene glycol monoethyl ether
HEGL ethylene glycol monohexyl ether
DPME dipropylene glycol monomethyl ether
PME propylene glycol monomethyl ether
DEGM diethylene glycol dimethyl ether
T toluene
TEX 2,2,4-trimethylpentane-1,3-diol monoisobutyrate (Texanol)
HST urea Preparation of the Epoxy Resin-amine Adducts AI to AV
Adduct AI:
In a reaction vessel equipped with thermometer, stirrer and reflux condenser, 190 g of EPH I (1 mol of epoxide groups) were dissolved in 132 g of toluene and the solution was heated to 60° C. Then a mixture of 59 g of DEAPA (0.45 mol) and 58 g of EHA (0.45 mol) were slowly added, the reaction temperature being held at from 75 to 80° C. with cooling of the batch where appropriate. The temperature was maintained until epoxide groups were no longer detectable. The adduct solution was directly processed further; the adduct contained 0.8 mol of NH groups.

Adduct AII:
In the same way as for AI, a solution of 475 g of EPH II (1 mol of epoxide groups) in 254 g of toluene was reacted with 59 g of DEAPA and 58 g of EHA (each 0.45 mol). The product contained 0.8 mol of NH groups.

Adduct AIII:
In the same way as for AI, a solution of 640 g of EPH III (2 mol of epoxide groups) in 71 g of DEGM was reacted with 117 g of DEAPA (0.9 mol) and 66 g of NBA (0.9 mol). The product contained 1.6 mol of NH groups in 823 g of solid resin.

Adduct AIV:
In the same way as for AI, a solution of 760 g of EPH I (4 mol of epoxide groups) in 362 g of toluene was reacted with 260 g of DEAPA (2 mol) and 114 g of HMDA (1 mol). The product contained 4.0 mol of NH groups in 1134 g of solid resin.

Adduct AV:
In the same way as for AI, a solution of 190 g of EPH I (1 mol of epoxide groups) in 47.5 g of toluene was reacted with 78 g of DEAPA (0.6 mol) and 21 g of DEA (0.3 mol, as modifier). The product contained 0.5 mol of NH groups in 289 g of solid resin.

Binder 1:
439 g of AI (0.8 mol of NH) were heated to 60° C., 182 g of BPA (0.8 mol) and 75.8 g of PF 91 (2.3 mol $CH_2O$) were added, and heating was continued to 80° C. The reaction temperature was maintained with stirring until the remaining mass of formaldehyde had fallen to below 0.3% of the initial level. The reaction product had an amine number of 135 mg/g. For the preparation of a low-solvent form of the binder, the resin was admixed with the intended amount of acid, corresponding to a degree of neutralization of about 25%, and then deionized water was added slowly with stirring to form a low-viscosity dispersion. A large part of the organic solvent was removed from this dispersion by distillation under reduced pressure at from 30 to 60° C.

Binders 2 to 5:
The batches, reaction conditions and characteristics are summarized in table 1. These binders were prepared in the same manner as binder 1.

TABLE 1

Preparation of the binders 2 to 5

| Binder | 2 | 3 | 4 | 5 |
|---|---|---|---|---|
| Amine adduct | AII | AIII | AIV | AV |
| Mass of the solution in g | 846 | 864 | 1460 | 336.5 |
| Mass of solid resin in g | 592 | 823 | 1134 | 289 |
| Amount of substance of NH groups in mol | 0.8 | 1.6 | 4 | 0.5 |
| Formaldehyde resin former | BPA | HST | PH | BPA |
| Mass in g | 160 | 96 | 315 | 96 |
| Amount of substance in mol | 0.7 | 1.6 | 3.5 | 0.42 |
| Amount of substance ratio phenol and/or urea groups/NH groups in mol/mol | 0.88 | 1 | 0.88 | 0.84 |
| PF 91 Mass of $CH_2O$ in g | 60 | 144 | 210 | 38 |
| Amount of substance of $CH_2O$ in mol | 2 | 4.8 | 7 | 1.25 |
| Reaction temperature in ° C. | 75 | 80 | 60 | 70 |
| Amine number in mg/g | 93 | 137 | 203 | 199 |

Paint Example 1:
250 g of binder 1 were dispersed with 70 g of titanium dioxide and 30 g of an aluminum silica pigment (ASP 600 from Engelhardt) in a bead mill with the addition of 5 g of acetic acid (30% strength solution in water) and 60 g of water for 2 hours. The pigmented formulation obtained in this way has a particle size below 12 μm. It was applied at a dry film thickness of 40 μm to a bright steel panel and was dried at room temperature for 72 hours. Thereafter the coated panel was subjected to a salt spray test (ASTM B 117-64) for 96 hours. The result is 2 mm undermining, with virtually no blistering observed.

Paint Example 2 to 5

Using the binders 2 to 5, further formulations were mixed and tested as for paint example 1. The results are summarized in table 2:

TABLE 2

| Paint comprising binder | 2 | 3 | 4 | 5 |
|---|---|---|---|---|
| Dry film thickness in μm | 50 | 55 | 45 | 50 |
| Drying time at room temperature in h | 48 | 36 | 72 | 36 |
| Unermining in the salt spray test in mm | 1.5 | 3 | 2 | 2.5 |
| Blisters | none | few | few | none |

What is claimed is:

1. A method of coating substrates comprising
   a) preparing an aqueous coating material from a water dilutable binder which is self-crosslinking at room temperature obtained by
      aa) reacting epoxy-amine adducts A together with formaldehyde F or formaldehyde donor compounds which split off formaldehyde under the reaction conditions, and formaldehyde resin formers B selected from the group consisting of phenols B1, substituted ureas and ureas B2, melamine B3, guanamines B4, and mixtures of said resin formers, to form a reaction product ABF,
      ab) neutralising the reaction product ABF to at least 5%,
      ac) diluting the neutralised reaction product ABF with deionised water,
      ad) processing the reaction product ABF and a pigment,
   b) applying the coating material of step a) to a substrate by brushing, roll coating or spraying, and
   c) drying the coating at room temperature by self-crosslinking,
   wherein step ad) is performed after step aa), after step ab) or after step ac).

2. The method of claim 1, comprising reacting in step aa) epoxy-amine adducts A which are reaction products of epoxy resins A1 containing at least 2 epoxide groups per molecule and having a specific epoxide group content of from 1 000 to 5 600 mmol/kg and aliphatic amines A2 having from one to 20 carbon atoms, the amines A2 containing at least one primary amino group.

3. The method of claim 2, comprising using aliphatic amines A2 which are mixtures of primary alkylamines and/or alkylenediamines with diamines having a primary amino group and a tertiary amino group, in the synthesis of the epoxy-amine adducts A.

4. The method of claim 1, comprising reacting, in step aa) the epoxy-amine adducts A, the formaldehyde F and the formaldehyde resin formers B in such amounts that the ratio of the amount of substance of the aminic hydrogen atoms in A to the amount of substance of the compounds B is from 0.5:1 to 1.1:1 and the ratio of the amount of substance of formaldehyde F to the amount of substance of the formaldehyde-reactive groups in B is from 0.25:1 to 0.9:1.

5. The method of claim 1, comprising reacting in step aa) formaldehyde resin formers B containing at least a mass fraction of 20% of amino resin formers selected from urea and substituted ureas B2, melamine B3, guanamines B4, and mixtures of these.

6. The method of claim 1, comprising reacting in step aa) epoxy-amine adducts A which are reaction products of epoxy resins A1 containing at least 2 epoxide groups per molecule and having a specific epoxide group content of from 1 000 to 5 600 mmol/kg and aliphatic amities A2 having from one to 20 carbon atoms, the amines A2 containing at least one primary amino group, and compounds A3 selected from compounds A3c containing at least one carboxyl group and compounds A3a containing at least one secondary amino group.

7. The method of claim 1, comprising applying in step b) the coating material of step a) to substrates are selected from the group consisting of metals, wood, textiles, paper, cardboard, and mineral substrates.

8. A substrate coated by the method of claim 1.

9. A metallic substrate coated by the method of claim 1.

* * * * *